(12) United States Patent
Sutskover (10) Patent No.: US 10,135,563 B2
(45) Date of Patent: Nov. 20, 2018

(54) TRIGGERING OF AN UPLINK PAIR OF PACKETS IN A WIRELESS LOCAL AREA NETWORK

(71) Applicant: Intel IP Corporation, Santa Clara, CA (US)

(72) Inventor: Ilan Sutskover, Hadera (IL)

(73) Assignee: Intel IP Corporation, Santa Clara, CA (US)

( * ) Notice: Subject to any disclaimer, the term of this patent is extended or adjusted under 35 U.S.C. 154(b) by 112 days.

(21) Appl. No.: 15/279,174

(22) Filed: Sep. 28, 2016

(65) Prior Publication Data

US 2018/0091256 A1 Mar. 29, 2018

(51) Int. Cl.
*H04L 1/00* (2006.01)
*H04B 7/0452* (2017.01)
*H04L 27/26* (2006.01)
*H04L 5/00* (2006.01)

(52) U.S. Cl.
CPC ......... *H04L 1/0003* (2013.01); *H04B 7/0452* (2013.01); *H04L 1/0009* (2013.01); *H04L 1/0025* (2013.01); *H04L 5/0007* (2013.01); *H04L 27/2602* (2013.01)

(58) Field of Classification Search
CPC ... H04L 1/0003; H04L 1/0009; H04L 1/0025; H04B 7/0452
USPC .... 370/349, 389, 208, 204, 400, 310.2, 328, 370/338, 322, 392
See application file for complete search history.

(56) References Cited

U.S. PATENT DOCUMENTS

| | | | |
|---|---|---|---|
| 2015/0063190 A1* | 3/2015 | Merlin | H04L 5/0037 370/312 |
| 2016/0100408 A1* | 4/2016 | Hedayat | H04L 65/4076 370/329 |
| 2016/0198358 A1* | 7/2016 | Rong | H04W 72/1268 370/235 |
| 2016/0323426 A1* | 11/2016 | Hedayat | H04W 28/0268 |
| 2017/0134043 A1* | 5/2017 | Lee | H03M 7/30 |
| 2017/0164351 A1* | 6/2017 | Ghosh | H04W 72/0413 |
| 2017/0279568 A1* | 9/2017 | Huang | H04L 5/005 |

* cited by examiner

*Primary Examiner* — Brenda H Pham
(74) *Attorney, Agent, or Firm* — Schwegman Lundberg & Woessner, P.A.

(57) ABSTRACT

Apparatuses, methods, and computer readable media for triggering of an uplink pair of packets in a wireless local area network. An apparatus is disclosed including processing circuitry configured to: encode a trigger frame, the trigger frame identifying stations, uplink (UL) resource unit (RUs), first modulation and coding schemes (MCSs) for a first multi-user (MU) UL transmission, and second MCSs for a second MU UL transmission. The processing circuitry may be further configured to transmit the trigger frame to the stations. The processing circuitry may be further configured to decode first UL packets from the stations, wherein the first UL packets are encoded with the first MCSs, and decode second UL packets from the stations, where the second UL packets are encoded with the second MCSs, and wherein each of the first UL packets and a corresponding second UL packet is to be received within a same corresponding UL RU.

21 Claims, 7 Drawing Sheets

TRIGGERING OF AN UPLINK PAIR OF PACKETS IN A WIRELESS LOCAL AREA NETWORK

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to triggering of an uplink (UL) pair of packets from stations in a wireless local-area network (WLAN).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
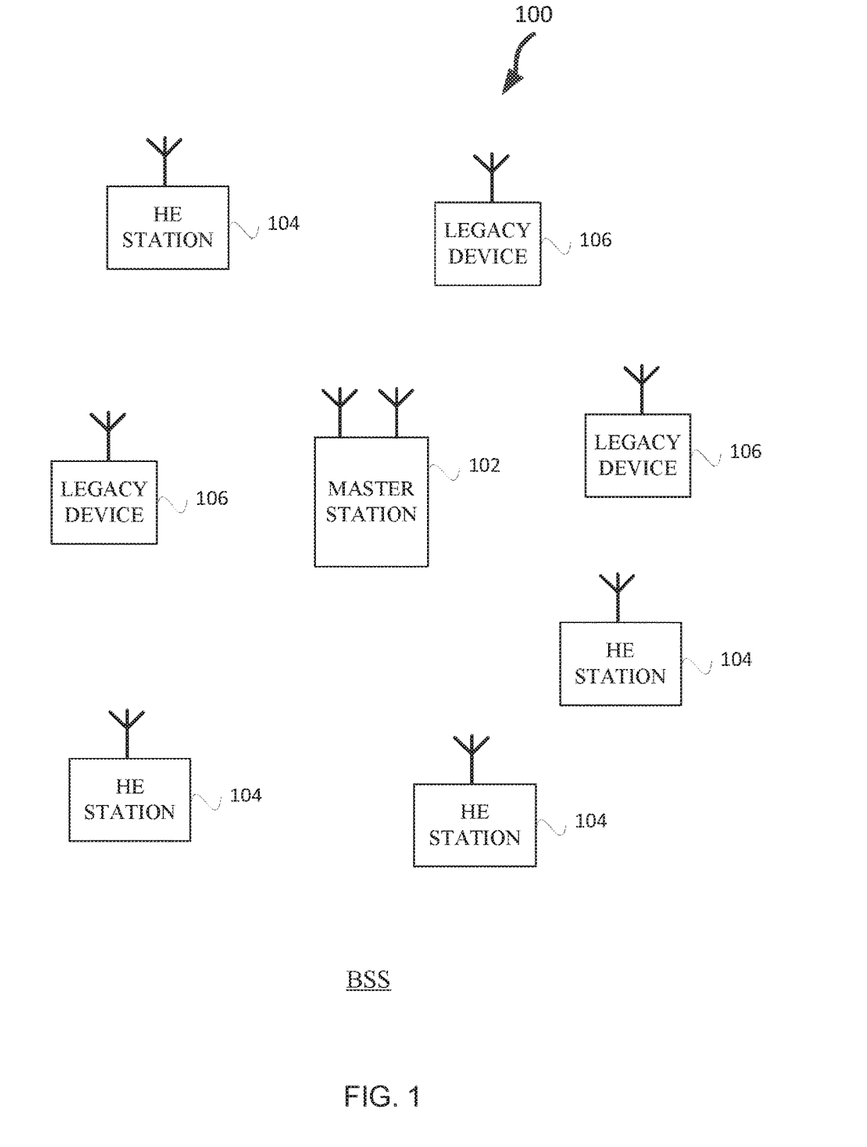
FIG. 1 illustrates a WLAN in accordance with some embodiments.

FIG. 1 illustrates a WLAN 100 in accordance with some embodiments. The WLAN 100 may comprise a basis service set (BSS) 100 that may include a master station 102, which may be an AP, a plurality of high-efficiency wireless (e.g., IEEE 802.11ax) (HE) stations 104, and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one master station 102 that is part of an extended service set (ESS). A controller (not illustrated) may store information that is common to the more than one master stations 102.

The legacy devices 106 may operate in accordance with one or more of IEEE 802.11 a/b/g/n/ac/ad/af/ah/aj/ay, or another legacy wireless communication standard. The legacy devices 106 may be STAs or IEEE STAs. The HE STAs 104 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 104 may be termed high efficiency (HE) stations.

The master station 102 may communicate with legacy devices 106 in accordance with legacy IEEE 802.11 communication techniques. In example embodiments, the master station 102 may also be configured to communicate with HE STAs 104 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPM).

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, The 26-subcarrier RU and 52-subcarrier RU are used in the 20 MHz, 40 MHz, 80 MHz, 160 MHz and 80+80 MHz OFDMA HE PPDU formats. The 106-subcarrier RU is used in the 20 MHz, 40 MHz, 80 MHz, 160 MHz and 80+80 MHz OFDMA and MU-MIMO HE PPDU formats. The 242-subcarrier RU is used in the 40

MHz, 80 MHz, 160 MHz and 80+80 MHz OFDMA and MU-MIMO HE PPDU formats. The 484-subcarrier RU is used in the 80 MHz, 160 MHz and 80+80 MHz OFDMA and MU-MIMO HE PPDU formats. The 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the master station 102. HE STA 104, and/or legacy device 106 may also implement different technologies such as code division multiple access (CDMA) 2000, CDMA 2000 1×, CDMA 2000 Evolution-Data. Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.11ax embodiments, a master station 102 may operate as a master station which may be arranged to contend for a wireless medium (e.g., during a contention period) to receive exclusive control of the medium for an HE control period. In some embodiments, the HE control period may be termed a transmission opportunity (TXOP). The master station 102 may transmit a HE master-sync transmission, which may be a trigger frame or HE control and schedule transmission, at the beginning of the HE control period. The master station 102 may transmit a time duration of the TXOP and sub-channel information. During the HE control period, HE STAs 104 may communicate with the master station 102 in accordance with a non-contention based multiple access technique such as OFDMA or U-MIMO. This is unlike conventional WLAN communications in which devices communicate in accordance with a contention-based communication technique, rather than a multiple access technique. During the HE control period, the master station 102 may communicate with HE stations 104 using one or more HE frames. During the HE control period, the HE STAs 104 may operate on a sub-channel smaller than the operating range of the master station 102. During the HE control period, legacy stations refrain from communicating. The legacy stations may need to receive the communication from the master station 102 to defer from communicating.

In accordance with some embodiments, during the TXOP the HE STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The master station 102 may also communicate with legacy stations 106 and/or HE stations 104 in accordance with legacy IEEE 802.11 communication techniques. In some embodiments, the master station 102 may also be configurable to communicate with HE stations 104 outside the HE TXOP in accordance with legacy IEEE 802.11 communication techniques, although this is not a requirement.

In some embodiments the HE station 104 may be a "group owner" (GO) for peer-to-peer modes of operation. A wireless device may be a HE station 102 or a master station 102.

In some embodiments, the HE station 104 and/or master station 102 may be configured to operate in accordance with IEEE 802.11mc.

In example embodiments, the HE station 104 and/or the master station 102 are configured to perform the methods and functions described herein in conjunction with FIGS. 1-7.

Figure 2:
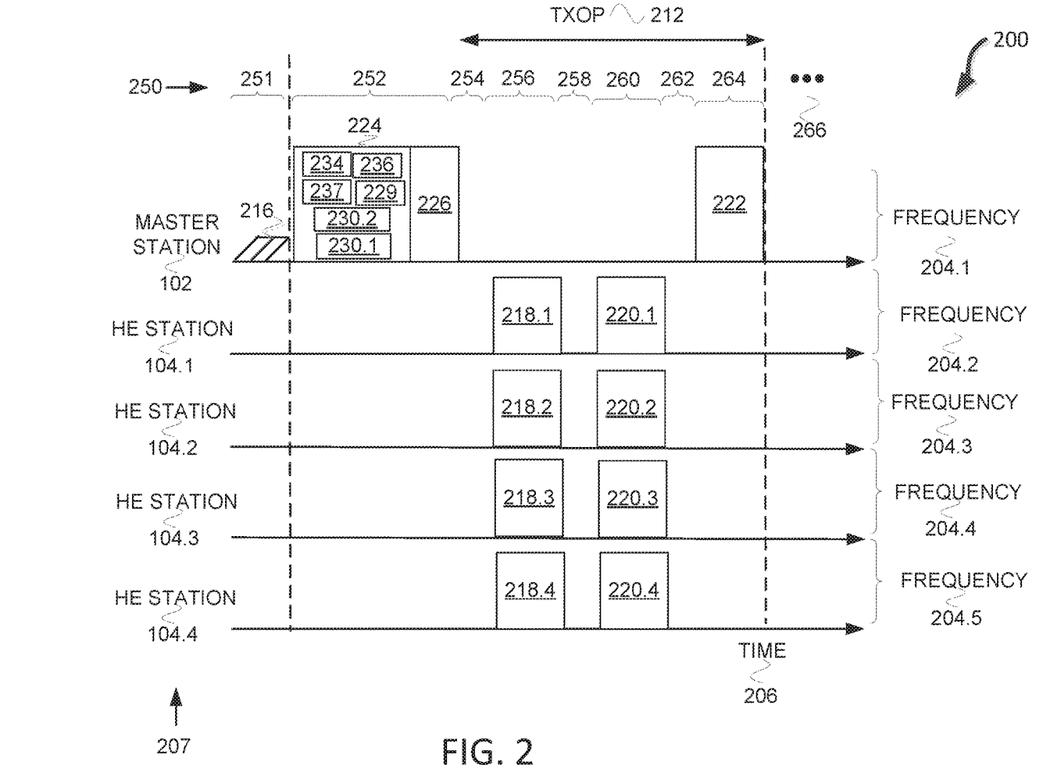
FIG. 2 illustrates a method for triggering of an UL pair of packets in a WLAN in accordance with some embodiments.

FIG. 2 illustrates a method 200 for triggering an UL pair of packets in a WLAN in accordance with some embodiments. Illustrated in FIG. 2 is time 206 along a horizontal axis, transmitters/receivers 207, operations 250 along the top, TF 224, first UL transmission 218, second UL 220 transmission, frequency 204 used by the transmitters/receivers 207, second DL transmission 222, and TXOP 212. The transmitters/receivers 207 may be a master station 102 or a HE station 104. The transmitters/receivers 207 may act as transmitters and/or receivers. The frequency 204 may be frequencies used for channels, e.g. less than 20 MHz (e.g, 26 data subcarriers), 20 MHz, 40 MHz, 80 MHz, 160 MHz, 320 MHz, or another bandwidth as disclosed herein. The frequencies 204 may be used in accordance with OFDMA and/or MU-MIMO. The frequencies 204 may overlap. For example, two HE stations 104 may be allocated the same frequencies 204 for MU-MIMO. Additionally, the frequency 204.1 used by the master station 102 to transmit on may be used by one or more of the HE stations 104 to transmit on with a sharing in time. The TXOP 212 may be a period where the master station 102 transmits a duration 234 that indicates that HE stations 104, master station 102, and legacy devices 106 that are not participating in the TXOP 212 (e.g, not indicated in the TF 224) should defer or set their network allocation vector (NAV). The master station 102 may extend the TXOP 212, in accordance with some embodiments. In some embodiments, the master station 102 may be a HE station 104 acting as a GO.

The method 200 may begin at operation 251 with the master station 102 contending 216 for the wireless medium. For example, the master station 102 may use a clear-channel assessment (CCA) to determine whether the wireless medium is in use.

In some embodiments, the method 200 may optionally include the master station 102 transmitting a clear-to-send (CTS)-to-self. The CTS-to-self may have a receiver address (RA) of the media access control (MAC) address of the master station 102 and duration that extends to time 206.

Figure 3:
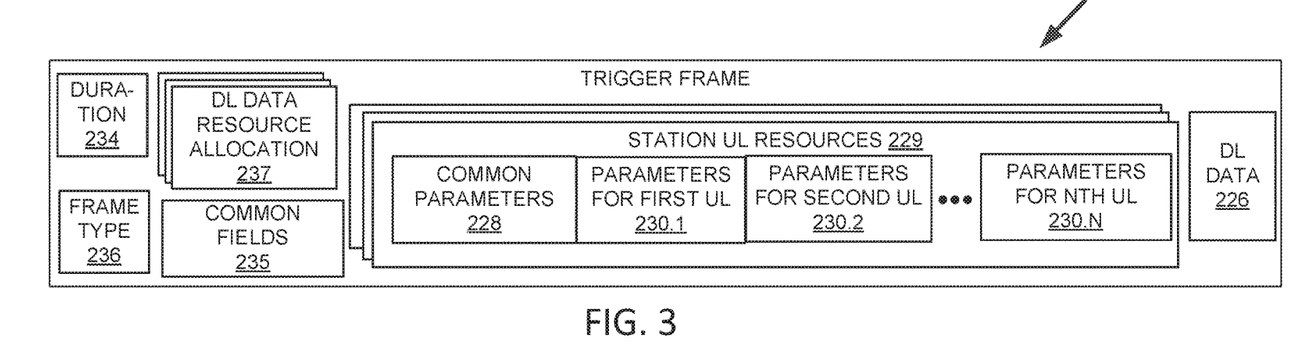
FIG. 3 illustrates a trigger frame (TF) for two or more UL transmissions in a WLAN in accordance with some embodiments.
Figure 4:
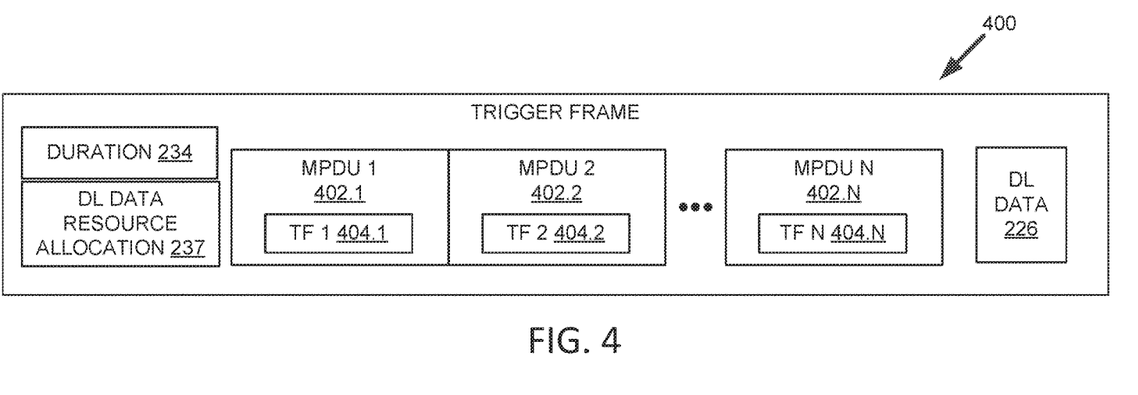
FIG. 4 illustrates a TF for two or more UL transmissions in a WLAN in accordance with some embodiments.

The method 200 may continue at operation 252 with the master station 102 transmitting a TF 224. FIGS. 3 and 4 are described in conjunction with method 200.

FIG. 3 illustrates a trigger frame (TF) 224 for two or more UL transmissions in a WLAN in accordance with some embodiments. The TF 224 may comprise a duration 234, a frame type 236, DL data resource allocation 237, station UL resources 229, and DL data 226. In some embodiments, the data 226 may be in one or more separate frames. There may be one station I.A, resources 229 for each HE station 104 that is receiving a resource allocation. The station UL resources 229 may include a common parameters 228, parameters for first UL 230.1 transmission, parameters for second UL 230.2 transmission through parameters for an nth UL 230.n transmission. The TF 224 may include a common fields 235 that includes parameters that are common for all the stations identified in the TF 224. For example, the common fields 235 may include an indication of an arrangement of RUs and/or MU-MIMO spatial streams. The common parameters 228 per station may then indicate the RU and spatial streams for the station.

In some embodiments, the DL data resource allocation 237 may be in a physical layer portion of the TF 224 and the station UL resources 229 may be in a MAC layer portion of the TF 224. The DL data resource allocation 237 may include a common part for all HE stations 104 that include an allocation in the resource allocation 237 and a per HE station 104 part.

The duration 234 may be a duration that may extend to time 206, which may be sufficient for operations 254, 256, 258, 260, 262, and 264. The duration 234 may indicate a duration or length for the first UL 218 transmission and the second UL 220 transmission. The master station 102 may be granted a TXOP 212 after the master station 102 receives first UL 218 transmission. The TXOP 212 may have a limit (not illustrated) that may extend past time 206.

In some embodiments, the frame type 236 may be a frame type or sub-frame type that indicates the frame is a TF type for triggering two or more UL transmissions. In some embodiments, the frame type may be indicated in a different way, e.g. a packet length or as part of another parameter. The frame type 236 may be cascade TF. The DL data resource allocation 237 may include a resource allocation for each of the HE stations 104 that receives a resource allocation for DL data 226. The DL data resource allocation 237 may include a duration or length, frequency, and bandwidth for a channel, a number of spatial streams, and air resource, e.g., MCS, for the HE station 104 to receive a portion of DL data 226. In some embodiments, the air resources may include coding parameters such as one or more of the following: a modulation and coding scheme (MCS), a code type (e.g., low-density parity check or convolutional coding), and dual carrier modulation (DCM) (e.g., DCM may be MCS 1, which without DCM is 1 bit/subcarrier, but with DCM it is 0.5 bit/subcarrier). The DL data resource allocation 237 may be part of a physical header of the TF 224 or TF 400.

The common parameters 228 may include an indication of a bandwidth and frequency 204 for the HE station 104 to use for a channel. In some embodiments, the common parameters 228 indicate an RU that is to be used for each of the UL transmissions. In some embodiments the common parameters 228 include an indication of duration or length for UL 218 transmission and/or UL 220 transmission. The common parameters 228 may indicate one or more spatial streams (SS) for the HE station 104 to use. In some embodiments, the combination of common fields 228 and common parameters 228 indicate an RU and spatial streams for the station to use. In some embodiments, the combination of common fields 228, common parameters 228, and/or parameters for first UL 230.1 transmission indicate an RU and spatial streams for the station to use.

The parameters for first UL 230.1 may include air resources for the HE station 104 to use to encode and transmit first UL 218.1 transmission. The parameters for second UL 230.2 may include air resources for the HE station 104 to use to encode and transmit second UL 220.1 transmission. The parameters for nth UL 230.n may include air resources for the HE station 104 to use to encode and transmit nth uplink 218.n (not illustrated) transmission. The air resource (e.g., parameters for first UL 230.1 transmission) may include one or more of the same parameters as the air resources described above.

The DL data 226 may be part of the same frame of the TF 224, e.g., part of the same PPDU. For example, the DL data 226 may be in the same media access control (MAC) protocol data unit (MPDU) or in a separate MPDU. In some embodiments, the DL data 226 may be in one or more different frames.

FIG. 4 illustrates a TF 400 for two or more UL transmissions in a WLAN in accordance with some embodiments. The TF 400 may include a duration 234, DL data resource allocation 237, MPDU 1 402.1 through MPDU N 402.N, and DL data 226. The MPDU 1 402.1 may include TF 1 404.1, TF 404.1 may include one or more of the fields of the TF 224. For example, TF 400 may include common parameters 228, duration 234, frame type 236, DL data resource allocation 237, common fields 235, and parameters for first UL 230.1 transmission for each HE station 104 that is allocated resources for a first UL transmission.

TF 404.2 may include one or more of the fields of the TF 224. For example, TF 400 may include common parameters 228, duration 234, frame type 236, data resource allocation 237, common fields 235, and parameters for second UL 230.1 transmission for each HE station 104 that is allocated resources for a first UL transmission.

The TF 2 404.2 may include the information of air resources for second UL 230.2 and may optionally include the resource allocation 229. The TF N 404.N may include the information of air resources for Nth uplink 230.n and may optionally include the resource allocation 229. The DL data 226 may be part of the same frame of the TF 400, e.g., part of the same PPDU. For example, the DL data 226 may be in the same MPDU or in a separate MPDU. In some embodiments, the data 226 may be in one or more different frames.

Returning to the method 200, the master station 102 may be configured to generate the TF 224 with a same common parameters 228 for each respective HE station 104 to use for both first uplink 218 transmission and second uplink 220 transmission in regards to the channel (e.g., bandwidth and frequency). In some embodiments, the number of spatial streams may be different. In some embodiments, the master station 102 may be configured to generate the TF 224 with a same common fields 235 for each HE station 104 to use for both first uplink 218 transmission and second uplink 220 transmission in regards to the channel (e.g., bandwidth and frequency). In some embodiments, the number of spatial streams may be different.

The parameters for first UL 230.1 transmission may include air resources (e.g., MCS) that are more robust, less robust, or the same as the air resource for the second UL 230.2 transmission.

For example, parameters for first UL 230.1 transmission and second UL 230.2 transmission may each be one of the following: Binary Phase Shift Keying (BPSK) and rate ½ with an MCS index=0; Quadrature Phase Shift Keying (QPSK) and rate ½ with the MCS index=1; QPSK and rate ¾ with the MCS index=2; 16-QAM, rate ½ with the MCS index=3; 16-QAM and rate ¾ with an MCS index=4; 64-QAM and rate ⅔ with the MCS index=5; 64-QAM and rate ¾ with an MCS index=6; 64-QAM and rate ⅚ with the MCS index=7; 256-QAM and rate ¾ with the MCS index=8; 256-QAM and rate ⅚ with the MCS index=9; 1024-QAM and rate ¾ with MCS index=10; and 1024-QAM and rate ⅚ with MCS index=11.

In some embodiments, the MCS index for the parameters for first UL 230.1 may have a MCS that is lower, higher, or the same as the index of the MCS of the parameters for the second UL 230.2. In some embodiments, the MCS index for parameters for second UL 230.2 may have an MCS index that is lower, higher, or the same as the MCS index of the parameters for the first UL 230.1 transmission.

The master station 102 may generate the DL data resource allocation 237 to transmit the DL data 226. The master station 102 may transmit a first portion of the TF 224 that does not include the DL data 226 in accordance with OFDMA on a primary channel and the DL data 226 on one or more channels in accordance with the DL data resource allocation 237 in accordance with one or both of OFDMA and MU-MIMO. The master station 102 may transmit a first portion of the TF 224 that does not include the DL data 226 in accordance with OFDMA and/or MU-MIMO on channels that correspond to the DL data resource allocation 237. For example, a different DL data resource allocation 237 may be transmitted on the channel corresponding to the resource allocation indicated in the DL data resource allocation 237.

In some embodiments, the master station 102 may generate different physical layer portions of the TF 224 and/or different MAC layer portions of the TF 224 that are then transmitted on the channels that are included in the respective physical layer portions and the MAC layer portions. For example, if first DL data resource allocation 237 is for primary 20 MHz channel and a second DL data resource allocation 237 is for a secondary 20 MHz channel, then the first DL data resource allocation 237 may be transmitted on the primary channel and the second DL data resource allocation 237 may be transmitted on the secondary channel simultaneously. Similarly, there may be one MAC layer portion, or the master station 102 may generate different MAC layer portions and simultaneously transmit them on the channels that are included in the respective MAC layer portion.

The method 200 may continue at operation 254 with the HE stations 104 waiting before transmitting first UL 218 transmission. The HE stations 104 may wait a short interframe space (SIFS), a reduced interframe space (RIFS), or another duration before transmitting.

The method 200 continues at operation 256 with the HE stations 104 transmitting first UL 218 transmission in accordance with common fields 235, common parameters 228 and parameters for first UL 230.1. The first UL 218 may be an acknowledgment of the DL data 226 or may include an acknowledgement of the DL data 226. An MCS of the parameters for first UL 230 may be more robust than an MCS of the parameters for the second UL 232. For example, HE station 104.2 may encode and transmit an acknowledgment with an MCS equal to 3 that indicates a 16 Quadrature Amplitude Modulation (QAM) and a coding rate of one half on a 20 MHz channel (or an RU that is less than a 20 MHz channel or greater than a 20 MHz channel) with an indicated frequency 204.2 range. The HE stations 104 may transmit the first UL 218 transmission in accordance with one or both of OFDMA or MU-MIMO.

The method 200 may continue at operation 258 with the HE stations 104 waiting before transmitting second uplink 220. The HE stations 104 may wait a short interframe space (SIFS), a reduced interframe space (RIFS), or another duration. The wait in operation 254 may be the same wait duration as the wait in operation 254 or a different wait duration. In some embodiments, the HE stations 104 do not wait before transmitting second UL 220.

The method 200 may continue at operation 260 with the HE stations 104 transmitting first UL 218 transmission in accordance with common fields 235, common parameters 228 and parameters for first UL 230.2.

The second UL 220 transmission may be data. The MCS of air resources for the second UL 220 transmission may be less robust than the MCS for the air resource for the first UL 230. For example, HE station 104.2 may encode data at an MCS of 8 that indicates a 256 QAM and a coding rate of three quarters on an RU with an indicated frequency 204.2 range. The reliability of the master station 102 receiving the first UL 218 transmission may be greater due to the parameters for the first UL 230.1 being more robust. In some embodiments, the parameters of the second UL 220 may be more robust than the parameters of the first UL 218. For example, the second UL 220 may transmit acknowledgments with an MCS=3, and the first UL 218 transmission may transmit data with an MCS=8. In some embodiments, the parameters of first UL 218 transmission and second UL 220 transmission may be the same. As described herein other parameters besides MCS may be changed to make the air resources more or less robust (e.g, DCM). The HE stations 104 may transmit the second UL 220 in accordance with one or both of OFDMA or MU-MIMO.

In some embodiments, the method 200 may end after operation 260. In some embodiments, the method 200 may continue at operation 262 with the master station 102 waiting before transmitting second DL 222. The master station 102 may wait a short interframe space (SIFS), a reduced interframe space (RIFS), or another duration.

In some embodiments, the method 200 may continue with operation 264 with the master station 102 transmitting second DL 222. The master station 102 may transmit second DL 222, which may be an acknowledgment (ACK) to first UL 218 and/or second UL 220. The second DL 222 may be a block ACK (BACK). In some embodiments, the second DL 222 may be transmitted on a different frequency 204.1 than the TF 224. The master station 102 may transmit the second downlink 222 in accordance with one or both of OFDMA and MU-MIMO.

In some embodiments, the second DL 222 may be a multi-user block acknowledgement (M-BA), which may be a multicast or broadcast frame and may include multiple ACKs or BACKs for multiple users. The master station 102 may ACK the first UL 218 or the second UL 220 in a different way. For example, in one embodiment, the master station 102 transmits a separate ACK to each of the HE stations 104 on their corresponding frequency 204. In another embodiment, the master station 102 may send another frame such as another TF 224 that implicitly ACKs the second UL 220.

The method 200 may end or continue with one or more additional operations 250 at 266. For example, the TF 224 may have included additional UL resources for the HE stations 104.

In some embodiments, one or more of the master station 102 and the HE stations 104 may be configured to communicate with another communication standard such as BlueTooth® or Long-Term Evolution (LTE), and the master station 102 and/or HE station 104 may be subject to intradevice coexistence constraints. For example, when BlueTooth® is actively receiving with a high priority, the master station 102 and/or HE station 104 may be configured to not transmit or transmit with a low transmit power. In some embodiments, the master station 102 and/or HE stations 104 may be configured to not delay transmitting some management frames such as ACKs or BACKs. In some embodiments, the master station 102 may be configured to generate the TF 224 with an MCS more robust in air resources for first UL 218, which may enable the HE stations 104 to transmit with a lower power. The lower power transmission may enable the HE station 104 to transmit even though a coexistent communication standard may be receiving.

Figure 5:
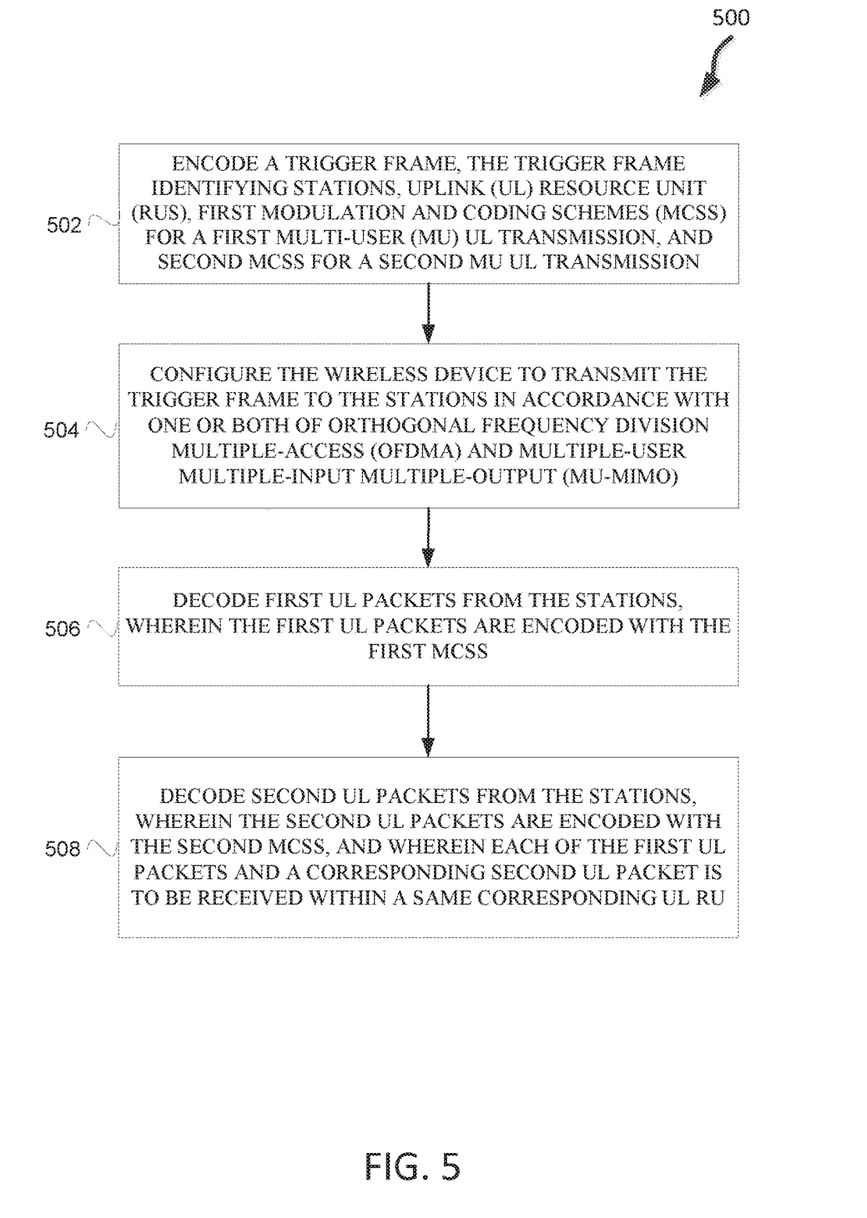
FIG. 5 illustrates a method for triggering of an UL pair of packets in a WLAN in accordance with some embodiments.

FIG. 5 illustrates a method 500 for triggering of an UL pair of packets in a WLAN, in accordance with some embodiments. The method 500 may begin at operation 502 with encoding a trigger frame, the trigger frame identifying stations, UL resource unit RU, first MCSs for a first MU UL transmission, and second MCSs for a second MU UL transmission. For example, a trigger frame may be encoded for one or more stations. The trigger frame may include one or more RUs, one or more air resources for a first UL, and one or more air resources for a second UL, where each of the stations of the one or more stations is to use a same RU indicated in the corresponding RU of the RUs. The parameters include an MCS in accordance with some embodiments. For example, master station 102 (FIG. 2) may encode TF 224 or TF 400 as described in conjunction with FIGS. 2-4.

The method 500 may continue at operation 504 with configuring the wireless device to transmit the trigger frame to the stations in accordance with one or both of OFDMA and MU-MIMO. For example, an apparatus of the master station 102 may configure the master station 102 to transmit the trigger frame in accordance one or both of OFDMA and MU-MIMO.

The method 500 may continue at operation 506 with decode first UL packets from the stations, wherein the first UL packets are encoded with the first MCSs. For example, the master station 102 may decode first 218 transmission as described in conjunction with FIG. 2.

The method 500 may continue at operation 508 with decode second UL packets from the stations, wherein the second UL packets are encoded with the second MCSs, and wherein each of the first UL packets and a corresponding second UL packet is to be received within a same corresponding UL RU. For example, the master station 102 may decode second UL 220 transmission as described in conjunction with FIG. 2. The method 500 may end or continue with one or more additional operations as described in conjunction with FIG. 2.

Figure 6:
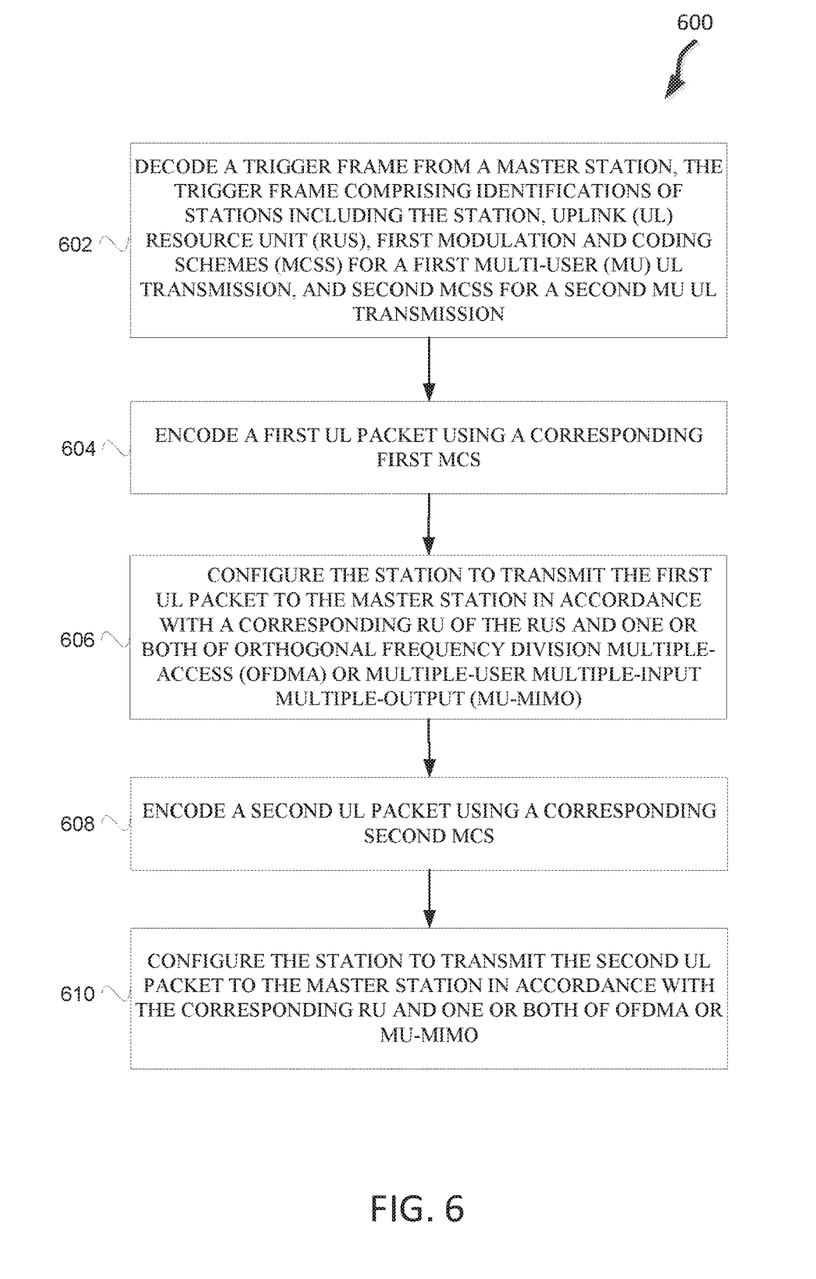
FIG. 6 illustrates a method for triggering of an UL pair of packets in a WLAN in accordance with some embodiments.

FIG. 6 illustrates a method 600 for triggering of an UL pair of packets in a WLAN in accordance with some embodiments. The method 600 may begin at operation 602 with decode a trigger frame from a master station, the trigger frame comprising identifications of stations including the station, UL RUs, first MCSs for a first MU UL transmission, and second MCSs for a second MU UL transmission. For example, the HE station 104 may decode TF 224 as described in conjunction with FIGS. 2-4. In some embodiments, a first MCS indicated in the parameters for the first UL is more robust than a second MCS indicated in the parameters for the second UL. For example, first UL 218 transmission may be acknowledgments that are encoded with a lower value MCS than second UL 220 transmission, which may be data.

The method 600 may continue at operation 604 with encoding a first frame for the first UL in accordance with the first MCS. For example, the HE stations 104 may encode first UL 218 as described in conjunction with FIGS. 2-4.

The method 600 may continue at operation 606 with configure the station to transmit the first UL packet to the master station in accordance with a corresponding RU of the RUs and one or both of OFDMA or MU-MIMO. For example, an apparatus of the HE stations 104 may configure the HE stations 104 to transmit the first frame.

The method 600 continues at operation 608 with encode a second UL packet using a corresponding second MCS. For example, the HE stations 104 may encode second UL 220 transmission as described in conjunction with FIGS. 2-4.

The method 600 continues at operation 610 with configure the station to transmit the second UL packet to the master station in accordance with the corresponding RU and one or both of OFDMA or MU-MIMO. For example, an apparatus of the HE stations 104 may configure the stations to transmit the second UL 220. The method 600 may end or continue with one or more operations as described in conjunction with FIGS. 2-4.

Figure 7:
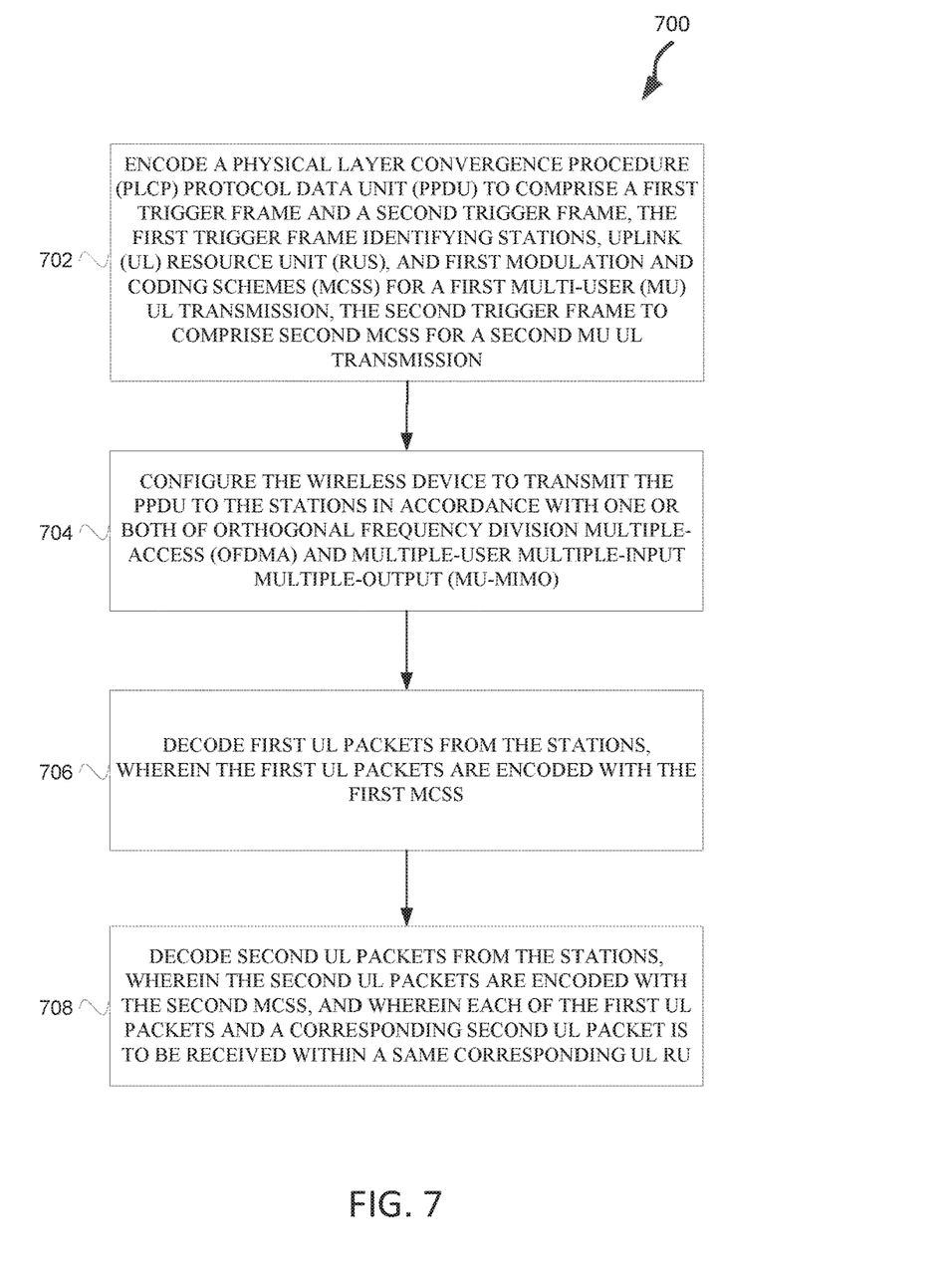
FIG. 7 illustrates a method for triggering of an UL pair of packets in a WLAN in accordance with some embodiments.

FIG. 7 illustrates a method 700 for triggering of an UL pair of packets in a WLAN in accordance with some embodiments. The method 700 may begin at operation 702 with encoding a PPDU to comprise a first trigger frame and a second trigger frame, the first trigger frame identifying stations, UL RUs, and first MCSs for a first MU UL transmission, the second trigger frame to comprise second MCSs for a second MU UL transmission.

For example, a trigger frame (e.g., FIG. 4) may include a first trigger frame and a second trigger frame, the first trigger frame identifying stations, UL RUs, and first MCSs for a first MU UL transmission, the second trigger frame to comprise second MCSs for a second MU UL transmission. For example, master station 102 (FIG. 2) may encode TF 400 as described in conjunction with FIGS. 2-4.

The method 700 may continue at operation 704 with configuring the wireless device to transmit the trigger frame to the stations in accordance with one or both of OFDMA and MU-MIMO. For example, an apparatus of the master station 102 may configure the master station 102 to transmit the trigger frame 400 in accordance one or both of OFDMA and MU-MIMO.

The method 700 may continue at operation 706 with decoding first UL packets from the stations, wherein the first UL packets are encoded with the first MCSs. For example, the master station 102 may decode first UL 218 as described in conjunction with FIG. 2.

The method 700 may continue at operation 708 with decode second UL packets from the stations, wherein the second UL packets are encoded with the second MCSs, and wherein each of the first UL, packets and a corresponding second UL packet is to be received within a same corresponding UL RU. For example, the master station 102 may decode second UL 220 as described in conjunction with FIG. 2. The method 700 may end or continue with one or more additional operations as described in conjunction with FIG. 2.

Figure 8:
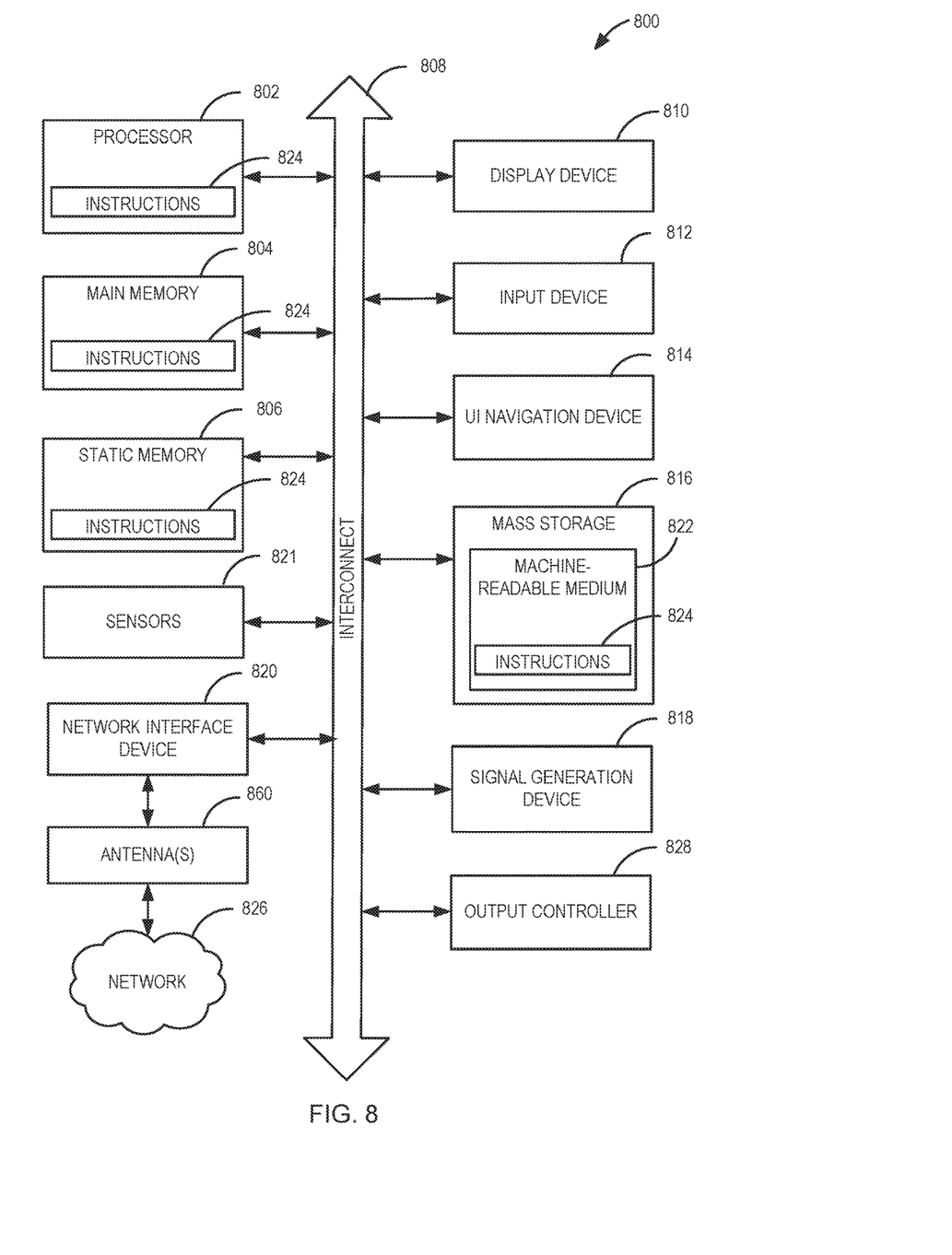
FIG. 8 illustrates a block diagram of an example machine upon which any one or more of the techniques (e.g., methodologies) discussed herein may perform in accordance with some embodiments.

FIG. 8 illustrates a block diagram of an example machine 800 up on which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a master station 102, HE station 104, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display device 810, an input device 812 (e.g., a keyboard), and a user interface (UI) navigation device 814 (e.g., a mouse). In an example, the display device 810, input device 812 and navigation device 814 may be a touch screen display. The machine 800 may additionally include a mass storage (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 802 and/or instructions 824 may comprise processing circuitry and/or transceiver circuitry.

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

An apparatus of the machine 800 may be one or more of a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820 utilizing any one of a number of transfer protocols (e.g., frame relay, internee protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 820 may include one or more physical jacks (e.g., Ethernet, coaxial, or phone jacks) or one or more antennas to connect to the communications network 826. In an example, the network interface device 820 may include one or more antennas 860 to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MEMO techniques. The term "transmission medium" shall be taken to include any intangible medium that is capable of storing, encoding or carrying instructions for execution by the machine 800, and includes digital or analog communications signals or other intangible medium to facilitate communication of such software.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The following disclose further embodiments. Example 1 is an apparatus of a wireless device, the apparatus including: memory, and processing circuitry coupled to the memory, the processing circuitry configured to: encode a trigger frame, the trigger frame identifying stations, uplink (UL) resource unit (RUs), first modulation and coding schemes (MCSs) for a first multi-user (MU) UL transmission, and second MCSs for a second MU UL, transmission; configure the wireless device to transmit the trigger frame to the stations in accordance with one or both of orthogonal frequency division multiple-access (OFDMA) and multiple-user multiple-input multiple-output (MU-MIMO); decode first UL packets from the stations, where the first UL packets are encoded with the first MCSs; and decode second UL packets from the stations, where the second UL packets are encoded with the second MCSs, and where each of the first UL packets and a corresponding second UL packet is to be received within a same corresponding UL RU.

In Example 2, the subject matter of Example 1 optionally includes where the processing circuitry is further configured to encode the trigger frame to further comprise first code types for the first MU UL transmission and second code types for the second MU UL transmission, where the first UL packets are encoded with the first MCSs and the first code types, and where the second UL packets are encoded with the second MCSs and the second code types.

In Example 3, the subject matter of any one or more of Examples 1-2 optionally include where the processing circuitry is further configured to encode the trigger frame to comprise first dual carrier modulations (DCMs) for the first MU UL transmission, and second DCMs for the second MU UL transmission.

In Example 4, the subject matter of any one or more of Examples 1-3 optionally include where the processing circuitry is further configured to: encode the trigger frame to further comprise downlink (DL) data resource allocations for the stations; and configure the wireless device to transmit the DL data in accordance with the DL data resource allocations to the stations and in accordance with one or both of OFDMA and MU-MIMO.

In Example 5, the subject matter of Example 4 optionally includes where the first UL packets from the stations are acknowledgements or block acknowledgments for the DL data.

In Example 6, the subject matter of any one or more of Examples 4-5 optionally include where the DL data resource allocations are encoded in a physical-layer header of the trigger frame.

In Example 7, the subject matter of any one or more of Examples 1-6 optionally include where each of the UL RUs comprises a grouping of subcarriers.

In Example 8, the subject matter of any one or more of Examples 1-7 optionally include where the first MCS and the second MCS are different.

In Example 9, the subject matter of Example 8 optionally includes where the first MCS is more robust than the second MCS.

In Example 10, the subject matter of any one or more of Examples 1-9 optionally include where the first MCS and the second MCS are each one from the following group: Binary Phase Shift Keying (BPSK) ½ with an MCS index=0; Quadrature Phase Shift Keying (QPSK) ½ with the MCS index=1; QPSK ¾ with the MCS index=2; 16-QAM ½ with the MCS index=3; 16-QAM ¾ with an MCS index=4; 64-QAM ⅔ with the MCS index=5; 64-QAM ¾ with an MCS index=6; 64-QAM ⅚ with the MCS index=7; 256-QAM ¾ with the MCS index=8; and, 256-QAM ⅚ with the MCS index=9, and where the first MCS has a lower value MCS index than the second MCS; 1024-QAM and rate ¾ with MCS index=10; and, 1024-QAM and rate ⅚ with MCS index=11.

In Example 11, the subject matter of any one or more of Examples 1-10 optionally include where the trigger frame further comprises a duration of a transmission opportunity where the duration is long enough for the stations to transmit the first ULs packets and the second UL packets.

In Example 12, the subject matter of any one or more of Examples 1-11 optionally include where the trigger frame comprises a trigger frame type field, and the processing circuitry is further configured to encode the trigger frame type field to indicate a trigger frame type that indicates two or more UL resource allocations are included in the trigger frame.

In Example 13, the subject matter of any one or more of Examples 1-12 optionally include where the wireless device and stations are each one from the following group: an Institute of Electrical and Electronic Engineers (IEEE) 802.11ax access point, an IEEE 802.11ax station, an IEEE 802.11ay access point, an IEEE 802.11ay station, a station, and an access point.

In Example 14, the subject matter of any one or more of Examples 1-13 optionally include transceiver circuitry coupled to the memory.

In Example 15, the subject matter of Example 14 optionally includes one or more antennas coupled to the transceiver circuitry.

Example 16 is a non-transitory computer-readable storage medium that stores instructions for execution by one or more processors of an apparatus of a wireless device, the instructions to configure the one or more processors to cause the apparatus to: encode a trigger frame, the trigger frame identifying stations, uplink (UL) resource unit (RUs), first modulation and coding schemes (MCSs) for a first multi-user (MU) UL transmission, and second MCSs for a second MU UL transmission; configure the wireless device to transmit the trigger frame to the stations in accordance with one or both of orthogonal frequency division multiple-access (OFDMA) and multiple-user multiple-input multiple-output (MU-MIMO); decode first UL packets from the stations, where the first lit packets are encoded with the first MCSs; and decode second UL, packets from the stations, where the second UL packets are encoded with the second MCSs, and where each of the first UL packets and a corresponding second UL packet is to be received within a same corresponding UL RU.

In Example 17, the subject matter of Example 16 optionally includes where the first MCS is more robust than the second MCS.

In Example 18, the subject matter of any one or more of Examples 16-17 optionally include where the first UL, packets from the stations are acknowledgements or block acknowledgments for downlink (DL) data from the wireless device.

Example 19 is a method performed by an apparatus of a wireless device, the method including: encoding a trigger frame, the trigger frame identifying stations, uplink (UL) resource unit (RUs), first modulation and coding schemes (MCSs) for a first multi-user (MU) UL transmission, and second MCSs for a second MU UL transmission; configuring the wireless device to transmit the trigger frame to the stations in accordance with one or both of orthogonal frequency division multiple-access (OFDMA) and multiple-user multiple-input multiple-output (MU-MIMO); decoding first UL packets from the stations, where the first UL packets are encoded with the first MCSs; and decoding second UL packets from the stations, where the second UL packets are encoded with the second MCSs, and where each of the first UL packets and a corresponding second UL packet is to be received within a same corresponding UL.

In Example 20, the subject matter of Example 19 optionally includes where the first MCS is more robust than the second MCS.

Example 21 is an apparatus of a station, the apparatus including: memory; and processing circuitry coupled to the memory, the processing circuitry configured to: decode a trigger frame from a master station, the trigger frame including identifications of stations including the station, uplink (UL) resource unit (RUs), first modulation and coding schemes (MCSs) for a first multi-user (MU) UL transmission, and second MCSs for a second MU UL transmission; encode a first UL packet using a corresponding first MCS; and configure the station to transmit the first UL packet to the master station in accordance with a corresponding RU of the RUs and one or both of orthogonal frequency division multiple-access (OFDMA) or multiple-user multiple-input multiple-output (MU-MIMO); encode a second UL packet using a corresponding second MCS; and configure the station to transmit the second packet to the master station in accordance with the corresponding RU and one or both of OFDMA or MU-MIMO.

In Example 22, the subject matter of Example 21 optionally includes where the trigger frame further comprises downlink (DL) data resource allocations for the stations, and where the processing circuitry is further configured to: decode DL data in accordance with a corresponding DL data resource allocation of the DL data resource allocations, and where the first frame is an acknowledgment of the DL data, and where the corresponding first MCS is more robust than the corresponding second MCS.

In Example 23, the subject matter of any one or more of Examples 21-22 optionally include transceiver circuitry coupled to the memory; and, one or more antennas coupled to the transceiver circuitry.

Example 24 is an apparatus of a wireless device, the apparatus including: memory, and processing circuitry coupled to the memory, the processing circuitry configured to: encode a physical layer convergence procedure (PLCP) protocol data unit (PPDU) to comprise a first trigger frame and a second trigger frame, the first trigger frame identifying stations, uplink (UL) resource unit (RUs), and first modulation and coding schemes (MCSs) for a first multi-user (MU) UL transmission, the second trigger frame to comprise second MCSs for a second MU UL transmission; configure the wireless device to transmit the PPDU to the stations in accordance with one or both of orthogonal frequency division multiple-access (OFDMA) and multiple-user multiple-input multiple-output (MU-MIMO); decode first UL packets from the stations, where the first UL packets are encoded with the first MCSs; and decode second UL packets from the stations, where the second UL packets are encoded with the second MCSs, and where each of the first UL packets and a corresponding second UL, packet is to be received within a same corresponding UL RU.

In Example 25, the subject matter of Example 24 optionally includes where the first trigger frame and the second trigger frame are each a media access control (MAC) Protocol Data Units (MPDUs), and where the second trigger frame further comprises the UL RUs.

In Example 26, the subject matter of any one or more of Examples 24-25 optionally include where the first MCS is more robust than the second MCS.

In Example 27, the subject matter of any one or more of Examples 24-26 optionally include transceiver circuitry coupled to the memory; and, one or more antennas coupled to the transceiver circuitry.

Example 28 is an apparatus of a wireless device, the apparatus including: means for encoding a trigger frame, the trigger frame identifying stations, uplink (UL) resource unit (RUs), first modulation and coding schemes (MCSs) for a first multi-user (MU) UL transmission, and second MCSs for a second MU UL transmission; means for configuring the wireless device to transmit the trigger frame to the stations in accordance with one or both of orthogonal frequency division multiple-access (OFDMA) and multiple-user multiple-input multiple-output (MU-MIMO); means for decoding first UL packets from the stations, where the first UL packets are encoded with the first MCSs; and means for decoding second UL packets from the stations, where the second UL packets are encoded with the second MCSs, and where each of the first UL packets and a corresponding second UL packet is to be received within a same corresponding UL RU.

In Example 29, the subject matter of Example 28 optionally includes the apparatus further including: means for encode the trigger frame to further comprise first code types for the first MU UL transmission and second code types for the second MU UL transmission, where the first UL packets are encoded with the first MCSs and the first code types, and where the second UL packets are encoded with the second MCSs and the second code types.

In Example 30, the subject matter of any one or more of Examples 28-29 optionally include the apparatus further including: means for encoding the trigger frame to comprise first dual carrier modulations (DCMs) for the first MU UL transmission, and second DCMs for the second MU UL transmission.

In Example 31, the subject matter of any one or more of Examples 28-30 optionally include the apparatus further including: means for encoding the trigger frame to further comprise downlink (DL) data resource allocations for the stations; and means for configuring the wireless device to transmit the DL data in accordance with the DL data resource allocations to the stations and in accordance with one or both of OFDMA and MU-MIMO.

In Example 32, the subject matter of Example 31 optionally includes where the first UL packets from the stations are acknowledgements or block acknowledgments for the DL data.

In Example 33, the subject matter of Example 32 optionally includes where the DL data resource allocations are encoded in a physical-layer header of the trigger frame.

In Example 34, the subject matter of any one or more of Examples 28-33 optionally include where each of the UL RUs comprises a grouping of subcarriers.

In Example 35, the subject matter of any one or more of Examples 28-34 optionally include where the first MCS and the second MCS are different.

In Example 36, the subject matter of Example 35 optionally includes where the first MCS is more robust than the second MCS.

In Example 37, the subject matter of any one or more of Examples 28-36 optionally include where the first MCS and the second MCS are each one from the following group: Binary Phase Shift Keying (BPSK) ½ with an MCS index=0; Quadrature Phase Shift Keying (QPSK) ½ with the MCS index=1; QPSK ¾ with the MCS index=2; 16-QAM ½ with the MCS index=3; 16-QAM ¾ with an MCS index=4; 64-QAM ⅔ with the MCS index=5; 64-QAM ¾ with an MCS index=6; 64-QAM ⅚ with the MCS index=7; 256-QAM ¾ with the MCS index=8; and, 256-QAM ⅚ with the MCS index=9, and where the first MCS has a lower value MCS index than the second MCS; 1024-QAM and rate ¾ with MCS index=10; and, 1024-QAM and rate ⅚ with MCS index=11.

In Example 38, the subject matter of any one or more of Examples 28-37 optionally include where the trigger frame further comprises a duration of a transmission opportunity where the duration is long enough for the stations to transmit the first ULs packets and the second UL packets.

In Example 39, the subject matter of any one or more of Examples 28-38 optionally include where the trigger frame comprises a trigger frame type field, and the apparatus further comprises means for encoding the trigger frame type field to indicate a trigger frame type that indicates two or more UL resource allocations are included in the trigger frame.

In Example 40, the subject matter of any one or more of Examples 28-39 optionally include where the wireless device and stations are each one from the following group: an Institute of Electrical and Electronic Engineers (IEEE) 802.11ax access point, an IEEE 802.11ax station, an IEEE 802.11ay access point, an IEEE 802.11ay station, a station, and an access point.

In Example 41, the subject matter of any one or more of Examples 28-40 optionally include means for processing radio signals.

In Example 42, the subject matter of Example 41 optionally includes means for transmitting and receiving radio signals.

Example 43 is a non-transitory computer-readable storage medium that stores instructions for execution by one or more processors of an apparatus of a wireless device, the instructions to configure the one or more processors to cause the apparatus to: decode a trigger frame from a master station, the trigger frame including identifications of stations including the station, uplink (UL) resource unit (RUs), first modulation and coding schemes (MCSs) for a first multi-user (MU) UL transmission, and second MCSs for a second MU UL transmission; encode a first UL packet using a corresponding first MCS; and configure the station to transmit the first UL packet to the master station in accordance with a corresponding RU of the RUs and one or both of orthogonal frequency division multiple-access (OFDMA) or multiple-user multiple-input multiple-output (MU-MIMO); encode a second UL packet using a corresponding second MCS; and configure the station to transmit the second UL packet to the master station in accordance with the corresponding RU and one or both of OFDMA or MU-MIMO.

In Example 44, the subject matter of Example 43 optionally includes where the trigger frame further comprises downlink (DL) data resource allocations for the stations, and where the instructions further configure the one or more processors to cause the apparatus to: decode DL data in accordance with a corresponding DL data resource allocation of the DL data resource allocations, and where the first frame is an acknowledgment of the DL data, and where the corresponding first MCS is more robust than the corresponding second MCS.

Example 45 is a method performed by an apparatus of a wireless device, the method including: decoding a trigger frame from a master station, the trigger frame including identifications of stations including the station, uplink (UL) resource unit (RUs), first modulation and coding schemes (MCSs) for a first multi-user (MU) UL transmission, and second MCSs for a second MU UL transmission; encoding a first UL packet using a corresponding first MCS; and configuring the station to transmit the first UL packet to the master station in accordance with a corresponding RU of the RUs and one or both of orthogonal frequency division multiple-access (OFDMA) or multiple-user multiple-input multiple-output (MU-MIMO); encoding a second UL packet using a corresponding second MCS; and configuring the station to transmit the second UL packet to the master station in accordance with the corresponding RU and one or both of OFDMA or MU-MIMO.

In Example 46, the subject matter of Example 45 optionally includes the method further including: decoding DL data in accordance with a corresponding DL data resource allocation of the DL data resource allocations, and where the first frame is an acknowledgment of the DL data, and where the corresponding first MCS is more robust than the corresponding second MCS.

Example 47 is an apparatus of a wireless device, the apparatus including: means for decoding a trigger frame from a master station, the trigger frame including identifications of stations including the station, uplink (UL) resource unit (RUs), first modulation and coding schemes (MCSs) for a first multi-user (MU) UL transmission, and second MCSs for a second MU UL transmission; means for encoding a first UL packet using a corresponding first MCS; and means for configuring the station to transmit the first UL packet to the master station in accordance with a corresponding RU of the RUs and one or both of orthogonal frequency division multiple-access (OFDMA) or multiple-user multiple-input multiple-output (MU-MIMO; means for encoding a second UL packet using a corresponding second MCS; and means for configuring the station to transmit the second UL packet to the master station in accordance with the corresponding RU and one or both of OFDMA or MU-MIMO.

In Example 48, the subject matter of Example 47 optionally includes the apparatus further including: means for decoding DL data in accordance with a corresponding DL data resource allocation of the DL data resource allocations, and where the first frame is an acknowledgment of the DL data, and where the corresponding first MCS is more robust than the corresponding second MCS.

Example 49 is a non-transitory computer-readable storage medium that stores instructions for execution by one or more processors of an apparatus of a wireless device, the instructions to configure the one or more processors to cause the apparatus to: encode a physical layer convergence procedure (PLCP) protocol data unit (PPDU) to comprise a first trigger frame and a second trigger frame, the first trigger frame identifying stations, uplink (UL) resource unit (RUs), and first modulation and coding schemes (MCSs) for a first multi-user (MU) UL transmission, the second trigger frame to comprise second MCSs for a second MU UL transmission; configure the wireless device to transmit the PPDU to the stations in accordance with one or both of orthogonal frequency division multiple-access (OFDMA) and multiple-user multiple-input multiple-output (MU-MEMO); decode first UL packets from the stations, where the first UL packets are encoded with the first MCSs; and decode second UL packets from the stations, where the second UL packets are encoded with the second MCSs, and where each of the first UL packets and a corresponding second UL packet is to be received within a same corresponding UL RU.

In Example 50, the subject matter of Example 49 optionally includes where the first trigger frame and the second trigger frame are each a media access control (MAC) Protocol Data Units (MPDUs), and where the second trigger frame further comprises the UL RUs.

In Example 51, the subject matter of any one or more of Examples 49-50 optionally include where the first MCS is more robust than the second MCS.

Example 52 is a method of an apparatus of a wireless device, the method including: encoding a physical layer convergence procedure (PLCP) protocol data unit (PPDU) to comprise a first trigger frame and a second trigger frame, the first trigger frame identifying stations, uplink (UL) resource unit (RUs), and first modulation and coding schemes (MCSs) for a first multi-user (MU) UL transmission, the second trigger frame to comprise second MCSs for a second MU UL transmission; configuring the wireless device to transmit the PPDU to the stations in accordance with one or both of orthogonal frequency division multiple-access (OFDMA) and multiple-user multiple-input multiple-output (MU-MIMO); decoding first UL packets from the stations, where the first UL packets are encoded with the first MCSs; and decoding second UL packets from the stations, where the second UL packets are encoded with the second MCSs, and where each of the first UL packets and a corresponding second UL packet is to be received within a same corresponding UL RU.

In Example 53, the subject matter of Example 52 optionally includes where the first trigger frame and the second trigger frame are each a media access control (MAC) Protocol Data Units (MPDUs), and where the second trigger frame further comprises the UL RUs.

In Example 54, the subject matter of any one or more of Examples 52-53 optionally include where the first MCS is more robust than the second MCS.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless device, the apparatus comprising:
memory; and processing circuitry coupled to the memory, the processing circuitry configured to:
encode a trigger frame, the trigger frame identifying a plurality of stations, and for each station of the plurality of stations, an uplink (UL) resource unit (RU), a first modulation and coding scheme (MCS), and a first code type for a first multi-user (MU) UL transmission, the trigger frame further identifying for each station of the plurality of stations, a second MCS and a second code type for a second MU UL transmission, wherein the trigger frame further identifies a trigger frame type field, wherein the trigger frame type field indicates that two or more resource allocations are included in the trigger frame;
configure the wireless device to transmit the trigger frame to the stations in accordance with one or both of orthogonal frequency division multiple-access (OFDMA) and multiple-user multiple-input multiple-output (MU-MIMO);
decode first UL packets from stations of the plurality of stations, wherein the first UL packets are encoded with the first MCSs and the first code types; and
decode second UL packets from second stations of the plurality of stations, wherein the second UL packets are encoded with the second MCSs and the second code types, and wherein each of the first UL packets and a corresponding second UL packet is to be received within a same corresponding UL RU.

2. The apparatus of claim 1, wherein the processing circuitry is further configured to encode the trigger frame to comprise first dual carrier modulations (DCMs) for the first MU UL transmission, and second DCMs for the second MU UL transmission.

3. The apparatus of claim 1, wherein the processing circuitry is further configured to:
encode the trigger frame to further comprise downlink (DL) data resource allocations for the stations; and
configure the wireless device to transmit the DL data in accordance with the DL data resource allocations to the stations and in accordance with one or both of OFDMA and MU-MIMO.

4. The apparatus of claim 3, wherein the first UL packets from the stations are acknowledgements or block acknowledgments for the DL data.

5. The apparatus of claim 3, wherein the DL data resource allocations are encoded in a physical-layer header of the trigger frame.

6. The apparatus of claim 1, wherein each UL RU comprises a grouping of subcarriers.

7. The apparatus of claim 1, wherein the first MCS and the second MCS are different.

8. The apparatus of claim 7, wherein the first MCS is more robust than the second MCS.

9. The apparatus of claim 1, wherein the first MCS and the second MCS are each one from the following group: Binary Phase Shift Keying (BPSK) ½ with an MCS index=0; Quadrature Phase Shift Keying (QPSK) ½ with the MCS index=1; QPSK ¾ with the MCS index=2; 16-QAM ½ with the MCS index=3; 16-QAM ¾ with an MCS index=4; 64-QAM ⅔ with the MCS index=5; 64-QAM ¾ with an MCS index=6; 64-QAM ⅚ with the MCS index=7; 256-QAM ¾ with the MCS index=8; and, 256-QAM ⅚ with the MCS index=9, and wherein the first MCS has a lower value MCS index than the second MCS; 1024-QAM and rate ¾ with MCS index=10; and, 1024-QAM and rate ⅚ with MCS index=11.

10. The apparatus of claim 1, wherein the trigger frame further comprises a duration of a transmission opportunity wherein the duration is long enough for the stations to transmit the first ULs packets and the second UL packets.

11. The apparatus of claim 1, wherein the wireless device and stations are each one from the following group: an Institute of Electrical and Electronic Engineers (IEEE) 802.11ax access point, an IEEE 802.11ax station, an IEEE 802.11ay access point, an IEEE 802.11ay station, a station, and an access point.

12. The apparatus of claim 1, further comprising: transceiver circuitry coupled to the memory.

13. The apparatus of claim 12, further comprising: one or more antennas coupled to the transceiver circuitry.

14. A non-transitory computer-readable storage medium that stores instructions for execution by one or more processors of an apparatus of a wireless device, the instructions to:
encode a trigger frame, the trigger frame identifying a plurality of stations, and for each station of the plurality of stations, an uplink (UL) resource unit (RU), a first modulation and coding scheme (MCS), and a first code type for a first multi-user (MU) UL transmission, the trigger frame further identifying for each station of the plurality of stations, a second MCS and a second code type for a second MU UL transmission, wherein the trigger frame further identifies a trigger frame type field, wherein the trigger frame type field indicates that two or more UL resource allocations are included in the trigger frame;
configure the wireless device to transmit the trigger frame to the stations in accordance with one or both of orthogonal frequency division multiple-access (OFDMA) and multiple-user multiple-input multiple-output (MU-MIMO);
decode first UL packets from stations of the plurality of stations, wherein the first UL packets are encoded with the first MCSs and the first code types; and
decode second UL packets from second stations of the plurality of stations, wherein the second UL packets are encoded with the second MCSs and the second code types, and wherein each of the first UL packets and a corresponding second UL packet is to be received within a same corresponding UL RU.

15. The non-transitory computer-readable storage medium of claim 14, wherein the first MCS is more robust than the second MCS.

16. The non-transitory computer-readable storage medium of claim 14, wherein the first UL packets from the stations are acknowledgements or block acknowledgments for downlink (DL) data from the wireless device.

17. A method performed by an apparatus of a wireless device, the method comprising:
encoding a trigger frame, the trigger frame identifying a plurality of stations, and for each station of the plurality of stations, an uplink (UL) resource unit (RU), a first modulation and coding scheme (MCS), and a first code type for a first multi-user (MU) UL transmission, the trigger frame further identifying for each station of the plurality of stations, a second MCS and a second code type for a second MU UL transmission, wherein the trigger frame further identifies a trigger frame type field, wherein the trigger frame type field indicates that two or more UL resource allocations are included in the trigger frame;
configuring the wireless device to transmit the trigger frame to the stations in accordance with one or both of orthogonal frequency division multiple-access (OFDMA) and multiple-user multiple-input multiple-output (MU-MIMO);
decoding first UL packets from stations of the plurality of stations, wherein the first UL packets are encoded with the first MCSs and the first code types; and
decoding second UL packets from second stations of the plurality of stations, wherein the second UL packets are encoded with the second MCSs and the second code types, and wherein each of the first UL packets and a corresponding second UL packet is to be received within a same corresponding UL RU.

18. An apparatus of a wireless device, the apparatus comprising:
memory, and processing circuitry coupled to the memory, the processing circuitry configured to:
encode a physical layer convergence procedure (PLCP) protocol data unit (PPDU) to comprise a first trigger frame and a second trigger frame, the first trigger frame identifying stations, uplink (UL) resource unit (RUs), and first modulation and coding schemes (MCSs) and first code types for a first multi-user (MU) UL transmission, second MCSs and second code types for a second MU UL transmission, and a trigger frame type field, the trigger frame type indicating that two or more UL resource allocations are included in the trigger frame, wherein the first trigger frame and the second trigger frame are each a media access control (MAC) Protocol Data Units (MPDUs);
configure the wireless device to transmit the PPDU to the stations in accordance with one or both of orthogonal frequency division multiple-access (OFDMA) and multiple-user multiple-input multiple-output (MU-MIMO);
decode first UL packets from the stations, wherein the first UL packets are encoded with the first MCSs and the first code types; and
decode second UL packets from the stations, wherein the second UL packets are encoded with the second MCSs and the second code types, and wherein each of the first UL packets and a corresponding second UL packet is to be received within a same corresponding UL RU.

19. The apparatus of claim 18, wherein the first trigger frame and the second trigger frame are each a media access control (MAC) Protocol Data Units (MPDUs), and wherein the second trigger frame further comprises the UL RUs.

20. The apparatus of claim 18, wherein the first MCS is more robust than the second MCS.

21. The apparatus of claim 18, further comprising: transceiver circuitry coupled to the memory; and, one or more antennas coupled to the transceiver circuitry.

* * * * *